(12) United States Patent
Barker (10) Patent No.: US 7,886,642 B2
(45) Date of Patent: Feb. 15, 2011

(54) SYSTEMS AND METHODS FOR MONITORING A SAW BLADE DURING SAWING

(75) Inventor: Earl Barker, Enumclaw, WA (US)

(73) Assignee: EB Associates, Inc., Enumclaw, WA (US)

( * ) Notice: Subject to any disclaimer, the term of this patent is extended or adjusted under 35 U.S.C. 154(b) by 586 days.

(21) Appl. No.: 11/873,097

(22) Filed: Oct. 16, 2007

(65) Prior Publication Data

US 2009/0095378 A1 Apr. 16, 2009

(51) Int. Cl.
*G05B 19/18* (2006.01)
*B27B 1/00* (2006.01)
*B23Q 15/00* (2006.01)

(52) U.S. Cl. .............................. 83/73; 83/367; 144/356; 144/357; 700/167

(58) Field of Classification Search .................. 83/13, 83/73, 360, 367; 144/357, 420, 402, 356; 700/116, 167, 66, 264, 63, 188, 304, 59; 220/240, 200, 244; 345/833, 839
See application file for complete search history.

(56) References Cited

U.S. PATENT DOCUMENTS

| | | | |
|---|---|---|---|
| 3,931,589 A | 1/1976 | Aisenberg et al. | |
| 4,139,035 A * | 2/1979 | Bystedt et al. | 144/357 |
| 4,437,367 A | 3/1984 | Hauser | |
| 4,524,812 A | 6/1985 | Murphy | |
| 4,691,601 A | 9/1987 | Peddinghaus | |
| 4,926,917 A * | 5/1990 | Kirbach | 144/356 |
| 5,897,800 A | 4/1999 | Sawai et al. | |
| 5,949,086 A * | 9/1999 | Reponen et al. | 250/559.25 |
| 6,041,683 A | 3/2000 | Timperi et al. | |
| 6,064,035 A | 5/2000 | Toller et al. | |
| 6,094,269 A | 7/2000 | Ben-Dove et al. | |
| 6,127,649 A | 10/2000 | Toller et al. | |
| 6,382,062 B1 | 5/2002 | Smith | |
| 6,425,346 B1 | 7/2002 | Birk | |
| 6,437,357 B1 | 8/2002 | Weiss et al. | |
| 6,449,585 B1 | 9/2002 | Hyun et al. | |
| 6,466,305 B1 | 10/2002 | McBain | |
| 6,681,672 B2 * | 1/2004 | Myrfield | 83/367 |
| 6,988,439 B2 | 1/2006 | Liu et al. | |
| 7,308,921 B1 * | 12/2007 | Brewer, Sr. | 144/3.1 |
| 2001/0034561 A1 | 10/2001 | Myrfield | |
| 2004/0250917 A1 | 12/2004 | Kennedy et al. | |
| 2006/0053990 A1 | 3/2006 | Barker | |
| 2007/0263918 A1 | 11/2007 | Jenya | |

(Continued)

OTHER PUBLICATIONS

Office Action relating to U.S. Appl. No. 10/942,575, U.S. Patent and Trademark Office, mailed Mar. 15, 2007, 5 pages.

(Continued)

*Primary Examiner*—Ghassem Alie
(74) *Attorney, Agent, or Firm*—Seed IP Law Group PLLC (57) ABSTRACT

A light source is used to illuminate a sawn portion of a piece of wood and exposed surfaces of the saw blade on both sides of the sawn portion. The sawn portion and the exposed surfaces of the saw blade are then imaged substantially concurrently using a single image generator. At least one geometric characteristic of the sawn portion and at least one geometric characteristic of the saw blade are determined based on the imaging.

21 Claims, 9 Drawing Sheets

U.S. PATENT DOCUMENTS

| | | |
|---|---|---|
| 2008/0029511 A1 | 2/2008 | Barker et al. |
| 2009/0095377 A1 | 4/2009 | Barker |
| 2009/0095379 A1 | 4/2009 | Barker |
| 2009/0255607 A1 | 10/2009 | Barker |

OTHER PUBLICATIONS

Final Office Action relating to U.S. Appl. No. 10/942,575, U.S. Patent and Trademark Office, mailed Nov. 2, 2007, 13 pages.

Office Action relating to U.S. Appl. No. 10/942,575, U.S. Patent and Trademark Office, mailed Jun. 23, 2008, 12 pages.

"Automatic On-Line Control Solution for Multiple Parallel Sawn Pieces in Log Breakdown and Resaw," Inx Systems SeeCon SC2000 Real-Time Lumber Size Control System, Inx-Systems, Inc., Cumming, Georgia, 2 pages.

"Inx SeeCon SC2000 & SC2000L: True Real-Time Lumber Size Control System—Technical Considerations for Successful Installation," Inx Systems Technical Information, Inx-Systems, Inc., Cumming, Georgia, 2002, 8 pages.

"Inx SeeCon SC2000 On-Line Lumber Size Control System: Payback Time & Return-on-Investment," Inx-Systems, Inc., Cumming, Georgia, Dec. 12, 2001, 8 pages.

"Modern Mill-Wide Lumber Size Control: Methods and Components of a Complete Lumber Size Control System," Inx Systems Educational Information, Inx-Systems, Inc., Cumming, Georgia, 2002, 7 pages.

"SawMill Operator's Guide to Greater Profits: Everything Profit-Conscious Management Needs to Know about New True Real-Time Lumber Size Control," Inx Systems Managerial Information, Inx-Systems, Inc., Cumming, Georgia, 2002, 13 pages.

"SeeCon: MillWide Lumber Size Control" USNR Brochure, 2004, 2 pages.

"SeeCon True Real-Time Lumber Size Control System—Frequently Asked Questions," 2002, 7 pages.

"Size Does Matter"—Perceptron—USNR News, May 2003:1-3.

Vuorilehto, "Benefits of Continuous Dimension Control in Sawmills," Inx-Systems, Inc., Cumming, Georgia, 9 pages.

Vuorilehto, "Manual Lumber Measurement Too Slow for Today's Sawmills: Computerized Measures of Lumber After Blade or Setup Changes Gather Far More Accurate Data than Manual Methods; Fixing Errors is Faster," Inx-Systems, Inc., Cumming, Georgia, 8 pages.

Vuorilehto, "New Inx Saw Blade Manager Software Optimizes Production Volume and Quality; Minimizes Downtime and Blade Costs," Inx-Systems, Inc., Cumming, Georgia, 4 pages.

Vuorilehto, "Size Control of Lumber by Optical Means," Inx-Systems, Inc., Cumming, Georgia, 6 pages.

Barker, "Systems and Methods for Monitoring a Saw Blade During Sawing," Office Action mailed Jan. 27, 2010 for U.S. Appl. No. 11/873,101, 9 pages.

Barker, "Systems and Methods for Monitoring a Saw Blade During Sawing," Amendment filed Apr. 22, 2010 for U.S. Appl. No. 11/873,101, 20 pages.

* cited by examiner

SYSTEMS AND METHODS FOR MONITORING A SAW BLADE DURING SAWING

BACKGROUND

1. Technical Field

This description generally relates to saw blades, and more particularly to monitoring saw blades during sawing.

2. Description of the Related Art

The sawmill industry has become largely automated. Full length tree trunks are delivered to sawmills, where they are automatically debarked, scanned and cut into log segments based on their scanned geometry. These log segments are then typically processed by a number of automated machines, depending on the sawmill and the type of wood. These machines produce lumber from each log segment, often without any human intervention.

In some sawmills, for example, each log segment is scanned, and a computer optimizer determines an optimal mix of lumber that can be obtained from that log segment based on its scanned geometry. For example, the computer optimizer may determine that a given log segment can be processed to obtain 3 2"×10" boards, which represents the highest current market value obtainable from that log segment. Based on this optimal mix of lumber, the log segment is rotated as necessary and driven on a log carriage across one or more saw blades to saw the log segment appropriately.

In such an environment, accurate, timely feedback systems are highly desirable for constantly monitoring the sawing process to ensure that the sawmill is deriving the optimal mix of lumber. Yet, current feedback systems do not provide enough information to control this evolving process. For example, although the initial optimal mix of lumber based on the geometry of the log segment surface may have been 3 2"×10" boards, knots hidden within the log segment may make this mix of lumber less valuable. If these "hidden" knots were later detected, the sawing process could be modified to obtain a new optimal mix of lumber from the remaining log segment. As another example, the saw blades and the mechanical components moving the log segment may come out of alignment. If, as a result, one of the boards were cut too thick (e.g., 1.9" rather than 1.8"), then the sawing process might be modified to obtain a new optimal mix of lumber if this sawing mistake were detected. Indeed, with better feedback systems, such misalignment might be detected and corrective action taken before such a sawing mistake occurs.

It is therefore desirable to have improved feedback systems to provide insight into the sawing process without the need for human intervention.

BRIEF SUMMARY

An automatic feedback system that can provide many of the above advantages is described below. The feedback system includes a planar laser scanner located near a saw blade. As a log segment (for example) is sawn by the saw blade, the laser scanner scans both the saw blade as well as the sawn portion of the log segment. With the laser scanner positioned to scan where the saw blade enters and exits the log segment, the feedback system can detect deflection in the saw blade anywhere along the length of the log segment. By scanning the log segment as well, the feedback system can detect the geometry of the sawn portion of the log segment along its entire length and can also determine the width of the new face of the log segment created by the sawing process.

To further improve the capabilities of the feedback system, the planar laser scanner may include a second laser upstream from the saw blade. The second laser can be positioned to scan the log segment right before sawing and can detect if last minute adjustments need to be made to properly position the log segment relative to the saw blade. The second laser can also be used to scan the log segment as the log segment is transported back to the starting point for a next pass to determine whether or not there are knots or other imperfections in the new face of the log segment that might necessitate a reevaluation of the optimal mix of lumber.

The feedback system includes a computer coupled to the laser scanner. Based on the scanned data, the computer can update and control the sawing process to ensure that the system is realizing the optimal mix of lumber based on the most up-to-date information about the log segment.

In one embodiment, a system for monitoring a sawing process includes a light source positioned to illuminate a sawn portion of a piece of wood as well as exposed surfaces of a saw blade to either side of the sawn portion. An image generator is positioned to generate an image of the sawn portion and the exposed surfaces substantially concurrently. The system also includes a computing device that receives data from the image generator. The computing device determines at least one geometric characteristic of the sawn portion and at least one geometric characteristic of the saw blade based on the received data.

In another embodiment, a saw blade may be monitored by: illuminating a sawn portion of a piece of wood and exposed surfaces of a saw blade to either side of the sawn portion; imaging the sawn portion and the exposed surfaces substantially concurrently; and determining at least one geometric characteristic of the sawn portion and at least one geometric characteristic of the saw blade.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing devices, illumination and imaging systems and/or saws have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Description of an Example System for Monitoring a Saw Blade

Figure 1A:
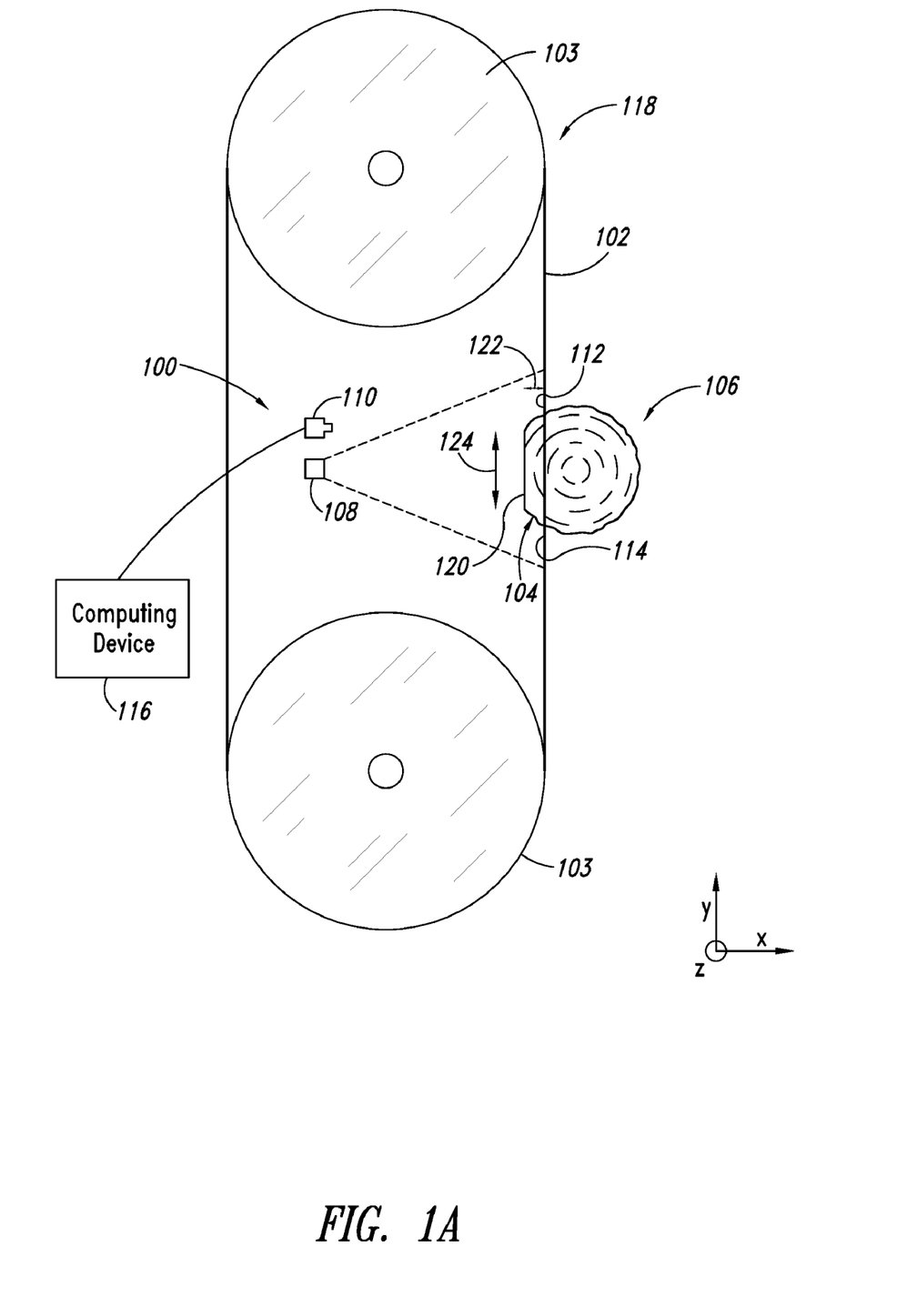
FIG. 1A is a front schematic view of a system for monitoring a saw blade and a sawn portion of a piece of wood, according to one illustrated embodiment.
Figure 1B:
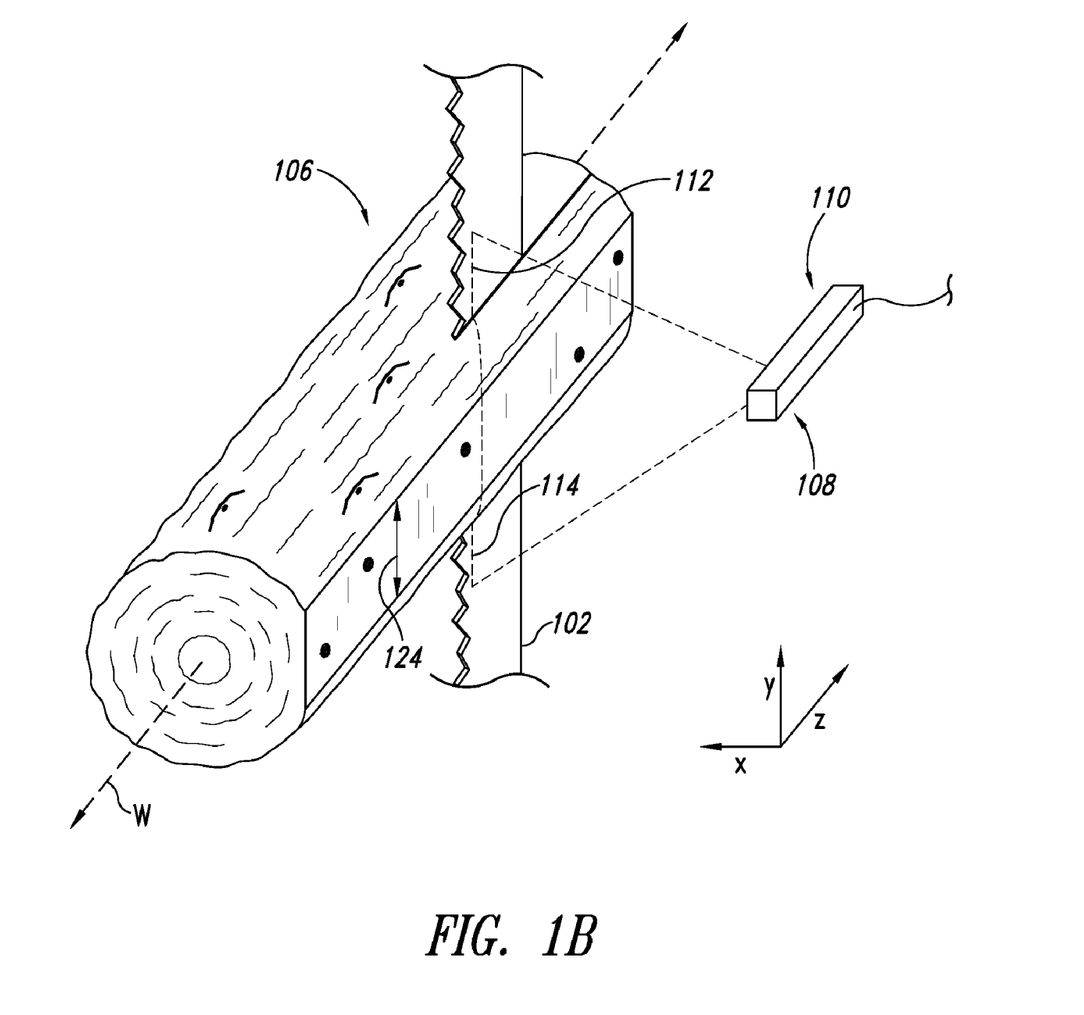
FIG. 1B is a perspective view of the system of FIG. 1A.

FIG. 1A shows a system 100 for monitoring a saw blade 102 and a sawn portion 104 of a piece of wood 106, according to one illustrated embodiment. FIG. 1B is a perspective view of the system 100 of FIG. 1A, and FIG. 1C is a side view of the saw blade 102 and the sawn portion 104 illuminated by the system 100 of FIG. 1A.

Figure 1C:
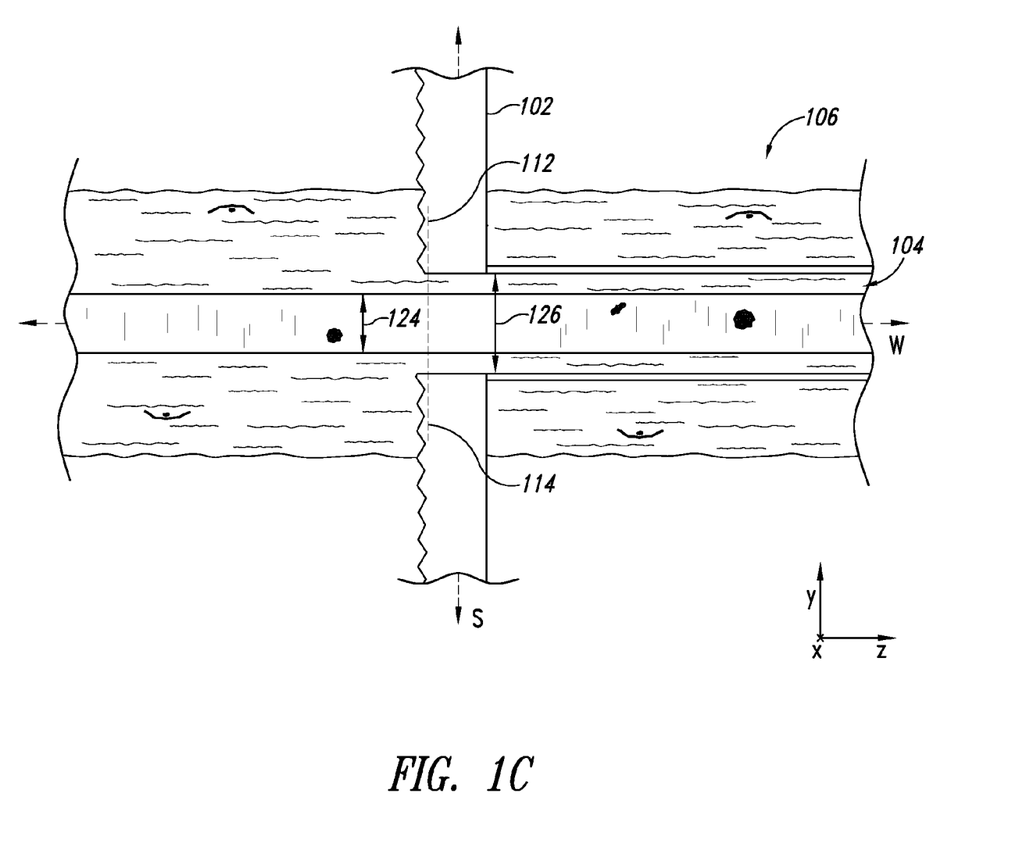
FIG. 1C is a side view of the saw blade and the sawn portion of the piece of wood illuminated by the system of FIG. 1A.

FIGS. 1A, 1B and 1C further include a coordinate system to facilitate discussion of the illustrated embodiments. As illustrated, the teeth of the saw blade 102 face the rear of FIG. 1A, in the negative z-direction, and the piece of wood 106 travels generally in the positive z-direction during sawing. The saw blade 102 moves up or down parallel to the y-axis in order to saw the piece of wood 106, while the piece of wood 106 may be moved parallel to the x-axis to adjust the thicknesses of pieces sawn from the piece of wood 106. Of course, it should be understood that the system 100, the saw blade 102 and the piece of wood 106 need not be oriented as illustrated. In other embodiments, other orientations relative to each other and relative to the ground may be desirable. A pair of saw guides (not shown) may also be positioned above and below the piece of wood 106 in order to stabilize the saw blade 102.

The saw blade 102 illustrated in FIG. 1A comprises a portion of a band saw 118. The band saw 118 includes top and bottom wheels 103 that rotate in order to drive the saw blade 102 in a clockwise or counterclockwise direction, as illustrated in FIG. 1A. Band saws may be used to process logs and other pieces of wood in a variety of sawmill environments. In one embodiment, for example, the band saw 118 may be used in combination with a second band saw (not shown) as part of a primary breakdown machine. The band saw 118 may thereby separate sideboards from cants for processing at various downstream stations throughout a sawmill. In another embodiment, the band saw 118 may be used in a headrig carriage mill to cut a single log into multiple pieces of wood by shuttling the log back and forth along the band saw 118. Of course, in other embodiments, the saw blade 102 need not comprise a portion of a band saw and need not be used in a sawmill. For example, in one embodiment, the saw blade may be part of a reciprocating saw.

The piece of wood 106 may represent any wood being sawn. In a sawmill, for example, the piece of wood 106 may comprise a log at any point in processing. The piece of wood may be a log before debarking, a log after debarking, a log segment, a cant, a flitch, a board, a piece of lumber, etc. As illustrated, the piece of wood 106 is a log segment on one side of which a face 120 has been created. The face 120 may be created by chippers or by a prior sawing operation. In one embodiment, the piece of wood 106 may be mounted on a log carriage (not shown). However, other means of transporting the piece of wood 106 may also be used, such as a sharp chain, press rolls or others.

The system 100 may include a light source 108 positioned to illuminate the sawn portion 104 and the saw blade 102, an image generator 110 positioned to generate an image of the illuminated surfaces, and a computing device 116 coupled to the image generator 110 to receive image data. In one embodiment, the light source 108 is positioned to illuminate a first exposed surface 112 to one side of the sawn portion 104, and a second exposed surface 114 to another side of the sawn portion 104. As illustrated, the sawn portion 104 has just been sawn by the saw blade 102 during monitoring. Therefore, in one embodiment, the sawn portion 104 is located adjacent the saw blade 102 and between the light source 108 and the saw blade 102, thereby obscuring portions of the saw blade 102.

The light source 108 may be positioned to face the saw blade 102 at approximately a right angle. As illustrated, the light source 108 is positioned such that a line of light produced by the light source 108 is approximately centered about a central axis W of the piece of wood 106, and is approximately aligned with a location near the saw teeth but on the flat surface of the saw blade 102. In certain embodiments, the light source 108 may be fixed relative to the saw blade 102. In such an embodiment, when cutting pieces of wood having different diameters, the light source 108 may be more or less displaced with respect to the central axis W of the piece of wood 106. In other embodiments, to achieve improved illumination, the light source 108 may be movable in the y-direction. For example, a stepper motor controlled by the computing device 116 may be used, in one embodiment, to position the light source 108 for each new piece of wood.

Other orientations of the light source 108 relative to the saw blade 102 and piece of wood 106 may also be used. For example, the light source 108 may be displaced in any direction with respect to the central axes S and W but angled to produce the line of laser light along the saw blade 102 and the piece of wood 106. In other embodiments, the light source 108 may illuminate different portions of the saw blade 102 and the sawn portion 104 of the piece of wood 106. In still other embodiments, the light source 108 may produce diffuse light that generally illuminates the saw blade 102 and piece of wood 106.

The light source 108 and image generator 110 may generate a series of two dimensional images for analysis by the computing device 116. Any of a variety of light sources 108 and image generators 110 may be used. For example, a planar laser scanner may comprise both the light source 108 and the image generator 110. Planar laser scanners emit "lines" of laser light by rapidly moving a source of laser light back and forth. Meanwhile, an image sensor, for example a high resolution video camera, serves as the image generator 110, capturing the laser light reflected back towards the planar laser scanner. The video camera may comprise a charged coupled device (CCD) camera, or another optical system. Laser scanners of this type are commercially available from a number of companies, including from JoeScan of Vancouver, Wash. In alternative embodiments, the light source 108 may comprise another collimated, non-laser light source or any other source of electromagnetic radiation, such as infrared or ultraviolet radiation. The image generator 110 may also be modified in alternative embodiments to generate images based on the reflected light.

In one embodiment, the single image generator 110 images substantially concurrently the sawn portion 104 and the illuminated, exposed surfaces 112, 114 of the saw blade 102. The imaging may be considered substantially concurrent if data from the image generator 110 forwarded to the computing device 116 includes data representative of both the sawn portion 104 and the exposed surfaces 112, 114. Of course, the image generator 110 may not image the sawn portion 104 and the exposed surfaces 112, 114 of the saw blade 102 exactly simultaneously, as the light source 108 may, in certain embodiments, be moved rapidly to create the illusion of a line. For example, the generated image may reflect the first surface 112 at 1.01 seconds, and the second surface 114 at 1.02 seconds as the light source 108 scans back and forth. Such imaging would be considered substantially concurrent.

As illustrated, the light source 108 and the image generator 110 may use triangulation to determine the three dimensional shape of the illuminated surfaces. In other embodiments, other methods for determining the shapes and contours of these surfaces may be used, for example, by measuring the time-of-flight of laser light emitted by the light source 108.

Image data from the image generator 110 may be sent to the computing device 116 for further analysis. In one embodiment, the computing device 116 determines at least one geometric characteristic of the sawn portion 104 based on the image data. The at least one geometric characteristic may comprise any location, shape or size information based on the imaged surface. For example, in one embodiment, the computing device 116 may determine a thickness 122 of the sawn portion 104 of the piece of wood 106 based on a distance in the x-direction between the locations of the exposed surfaces 112, 114 of the saw blade 102 and a face 120 of the sawn portion 104 closest to the light source 108. The computing device 116 may also determine a width 124 of the face 120 of the sawn portion 104. In still another embodiment, based on a distance in the y-direction between a top and bottom edge of the sawn portion 104, the computing device 116 may determine a width 126 of an opposite face of the sawn portion 104 adjacent the saw blade 102. In still another embodiment, the computing device 116 may determine size and shape geometry of the wane of the sawn portion 104 (i.e., the non-flat surfaces of the sawn portion 104). It may be understood that known geometry of the saw blade 102 and piece of wood 106 may also be taken into account in determining the above geometric characteristics. For example, side clearance of the saw blade 102 (i.e., the distance in the x-direction from the outside of the saw teeth to the flat surface of the saw blade 102) may be taken into account in determining the above geometric characteristics.

These geometric characteristics may be determined along the length of the piece of wood 106 as it is sawn. In one embodiment, the computing device 116 may determine geometric characteristics continuously. In another embodiment, the computing device 116 may determine at least one geometric characteristic of the piece of wood 106 at regular intervals (e.g., at least one geometric characteristic may be determined for each foot sawn by the saw blade 102). Other timing for these determinations is possible according to other embodiments.

The computing device 116 may also determine at least one geometric characteristic of the saw blade 102 based on the image data. In one embodiment, for example, the computing device 116 may determine a location of the saw blade 102 along the x-axis based on the exposed surfaces 112, 114. For example, the computing device 116 may determine that the saw blade 102 has flexed "inwards" in the negative x-direction (making the sawn portion 104 less thick). In one embodiment, the computing device 116 may detect this flex by comparing a "normal" location of the saw blade 102 when the saw blade 102 is not cutting with a deflected location of the saw blade 102 when the saw blade 102 is cutting.

Discussion of a Suitable Computing Device

Figure 2:
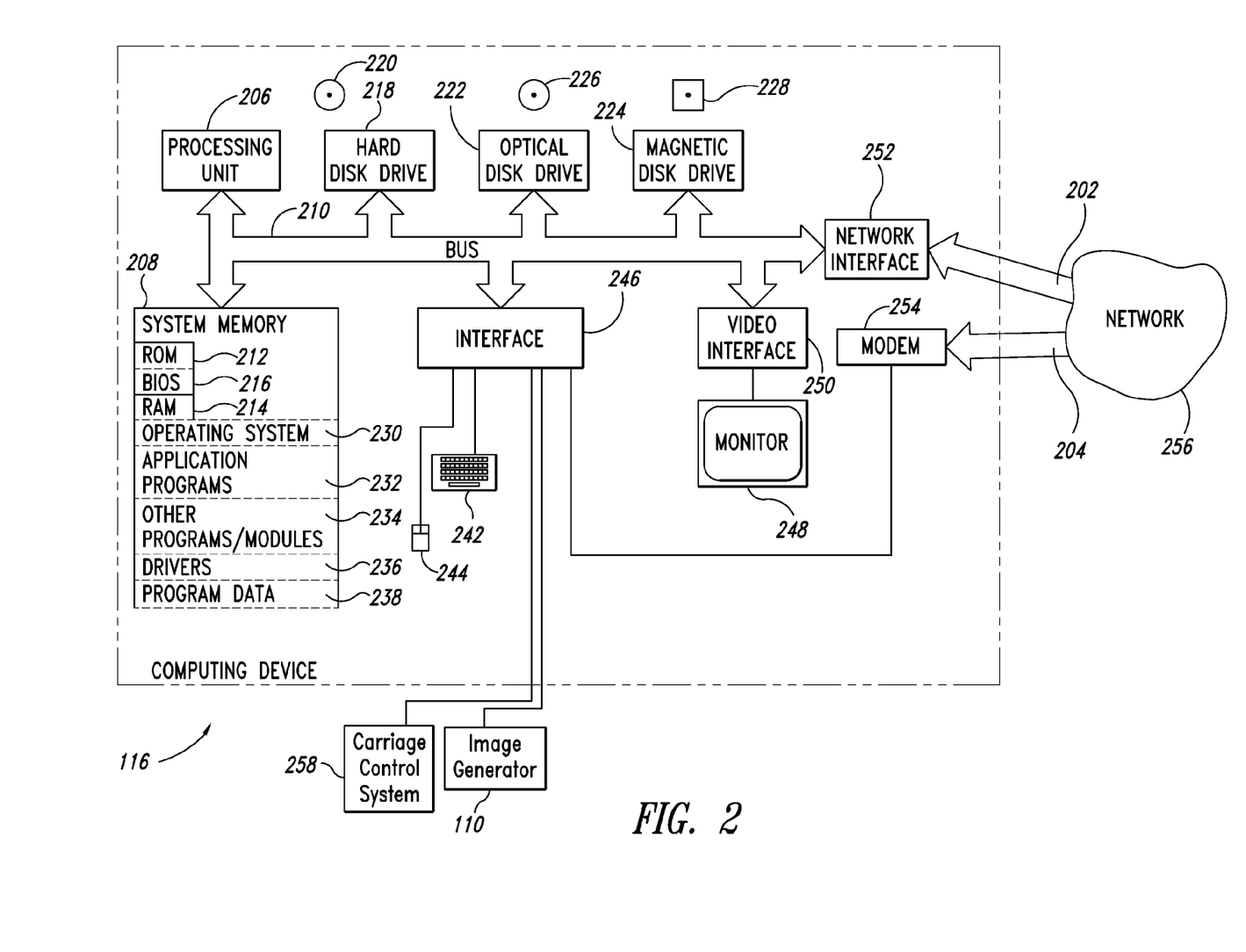
FIG. 2 is a schematic diagram of a computing device for use in the system of FIG. 1A, according to one illustrated embodiment

FIG. 2 and the following discussion provide a brief, general description of a suitable computing device 116 for use in the system 100. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 2 shows the computing device 116 coupled by one or more communications channels/logical connections 202, 204 to a network 256. However, in other embodiments, the computing device 116 need not be coupled to a network.

The computing device 116 may take the form of a conventional PC, which includes a processing unit 206, a system memory 208 and a system bus 210 that couples various system components including the system memory 208 to the processing unit 206. The computing device 116 will at times be referred to in the singular herein, but this is not intended to limit the embodiments to a single computing system, since in certain embodiments, the computing device 116 may include more than one computing system. Non-limiting examples of commercially available computing devices include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 206 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which can form part of the ROM 212, contains basic routines that help transfer information between elements within the computing device 116, such as during start-up.

The computing device 116 also includes a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processing unit 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, provide nonvolatile storage of computer-readable instructions, data structures, program modules and other data for the computing device 116. Although the depicted computing device 116 employs hard disk 220, optical disk 226 and magnetic disk 228, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, drivers 236 and program data 238. While shown in FIG. 2 as being stored in the system memory 208, the operating system 230, application programs 232, other programs/modules 234, drivers 236 and program data 238 can be stored on the hard disk 220 of the hard disk drive 218, the optical disk 226 of the optical disk drive 222 and/or the magnetic disk 228 of the magnetic disk drive 224. A user can enter commands and information into the computing device 116 through input devices such as a touch screen or keyboard 242 and/or a pointing device such as a mouse 244. Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. Although not shown, the computing device 116 can include other output devices, such as speakers, printers, etc.

The computing device 116 may operate in a networked environment using one or both of the logical connections 202, 204 to communicate with one or more remote computers, servers and/or devices through the network 256. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the computing device 116 may include a modem 254 for establishing communications over the WAN 204. Alternatively, another device, such as the network interface 252 (communicatively linked to the system bus 210), may be used for establishing communications over the WAN 202. The modem 254 is shown in FIG. 2 as communicatively linked between the interface 246 and the WAN 204. In a networked environment, program modules, application programs, or data, or portions thereof, can be stored in a server computing system (not shown). Those skilled in the relevant art will recognize that the network connections shown in FIG. 2 are only some examples of ways of establishing communications between computers, and other connections may be used, including wirelessly.

As illustrated in FIG. 2, the computing device 116 is further coupled to the image generator 110 and to a sawing control system 258. In one embodiment, both the image generator 110 and the sawing control system 258 are coupled to the system bus 210 through the interface 246 and are thereby communicatively coupled to the computing device 116. The image generator 110 may send image data in any suitable format to the computing device 116 for processing. The computing device 116 may include one or more application programs 232 for processing and interpreting this image data to determine the geometric characteristics discussed above. In one embodiment, the application programs 232 for processing the image data may further make a determination regarding the quality of the piece of wood 106 based at least in part on image data from the image generator 110.

The sawing control system 258 may comprise any of a variety of electromechanical systems for controlling a position of the piece of wood 106 relative to the saw blade 102. For example, in one embodiment, the sawing control system 258 may be coupled to a movable log carriage carrying the piece of wood 106, and a programmable logic controller (PLC) of the sawing control system 258 may receive commands from the computing device 116 and position the log carriage based on those commands. In one embodiment, the piece of wood 106 may be moved backwards and forwards in the z-direction relative to the saw blade 102, as well as side-to-side in the x-direction.

The computing device 116 may further include application programs 232 for determining an appropriate sawing path to take through a particular piece of wood 106. For example, in some embodiments, the computing device 116 may include a computer optimizer that receives earlier scanned data and/or image data from the image generator 110 and determines an optimal mix of lumber that can be obtained from the piece of wood 106. The computing device 116 may then send commands to the sawing control system 258 to position the piece of wood 106 to extract that optimal mix of lumber.

In other embodiments, the computing device 116 may be a separate device that may or may not communicate with the computer optimizer. In still other embodiments, the computing device 116 may not be coupled to the sawing control system 258 and may only determine geometric characteristics of the sawn portion 104 of the piece of wood 106 and the exposed surfaces 112, 114 of the saw blade 102.

Further Description of Example Systems for Monitoring a Saw Blade

Figure 3A:
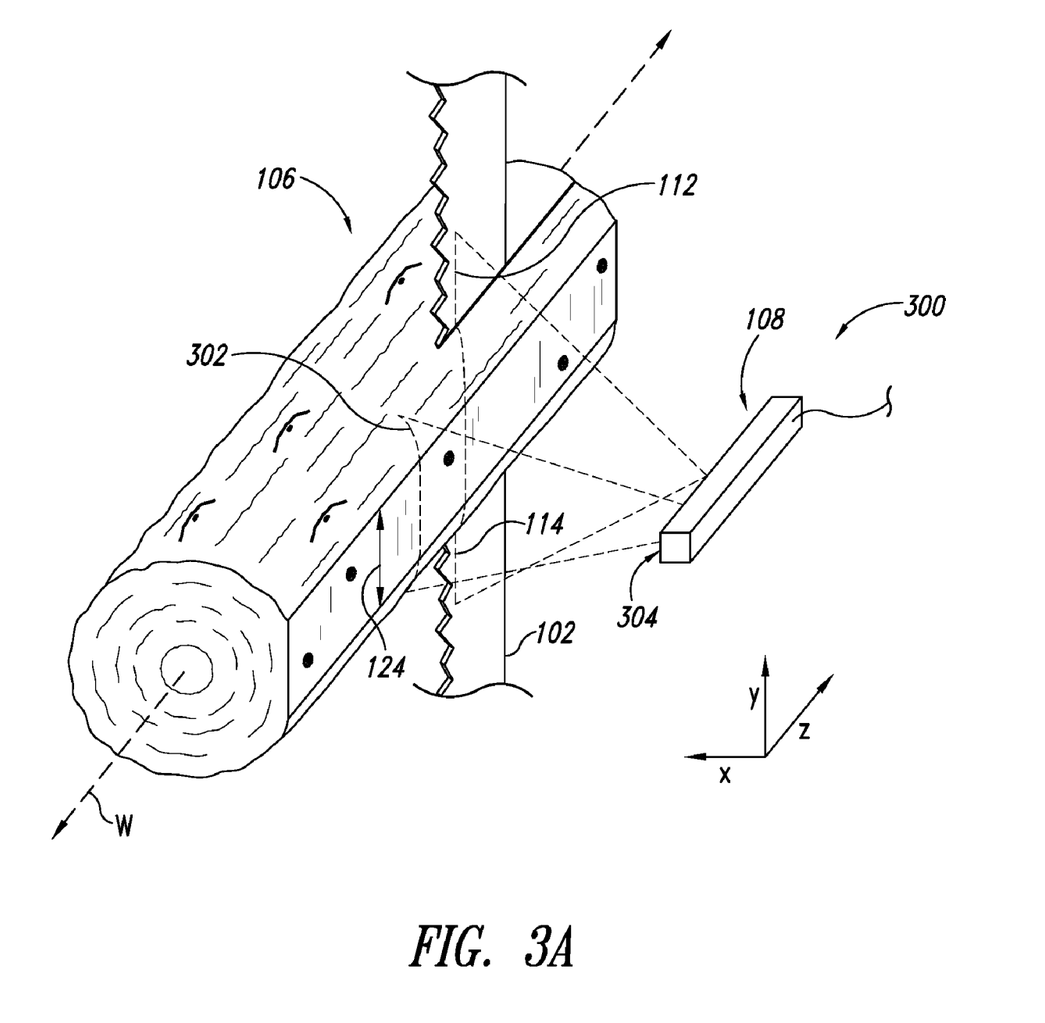
FIG. 3A is a perspective view of a system for monitoring a saw blade, a sawn portion of a piece of wood, and an upstream portion of the piece of wood, according to one illustrated embodiment.
Figure 3B:
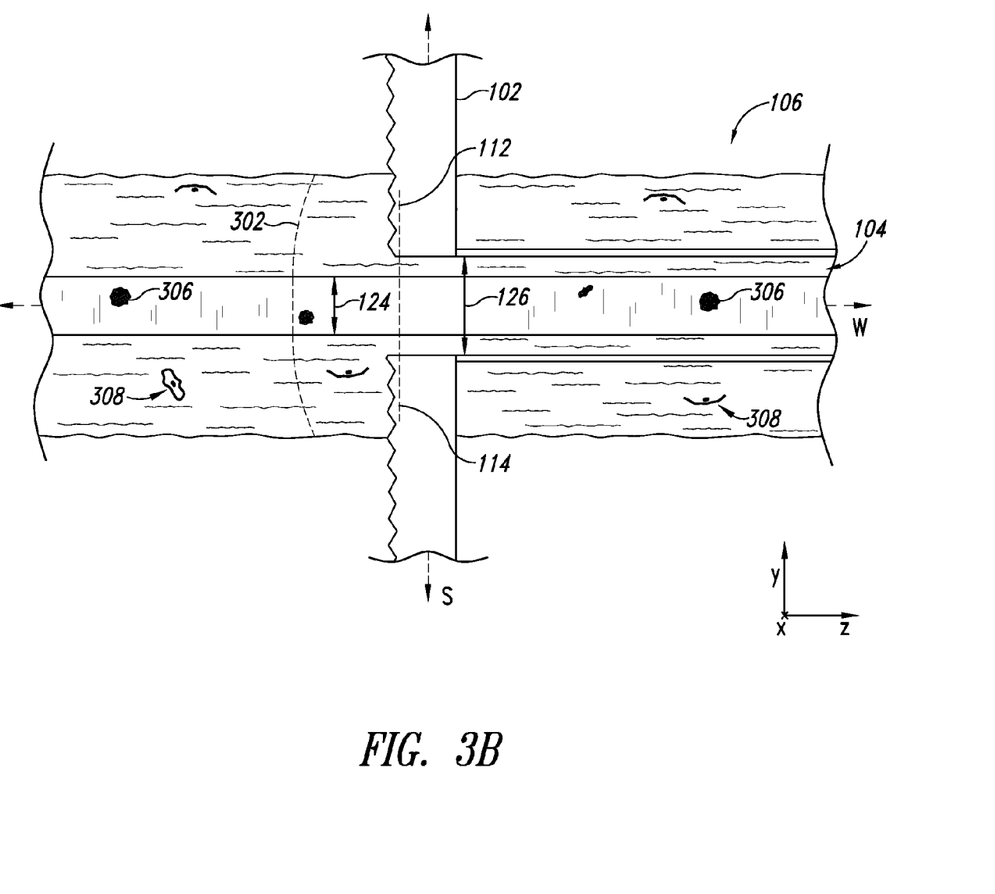
FIG. 3B is a side view of the saw blade, the sawn portion of the piece of wood and the upstream portion of the piece of wood illuminated by the system of FIG. 3A.

FIG. 3A is a perspective view of another system 300 for monitoring a saw blade 102, a sawn portion 104 of a piece of wood 106, and an upstream portion 302 of the piece of wood 106, according to one illustrated embodiment. FIG. 3B is a side view of the saw blade 102, the sawn portion 104 and the upstream portion 302, as illuminated by the system 300.

In one embodiment, the system 300 includes the light source 108, and a second light source 304 that illuminates the upstream portion 302 of the piece of wood 106. The image generator 110 may generate images of the illuminated upstream portion 302 of the piece of wood 106 and forward the image data on to the computing device 116. The computing device 116 may be further configured to determine at least one geometric characteristic of the upstream portion 302 of the piece of wood 106.

In one embodiment, the second light source 304 is configured similarly to the light source 108. For example, both the second light source 304 and the light source 108 may comprise sources of laser light moved rapidly back and forth to generate "lines" of laser light, as in a planar laser scanner. In still other embodiments, the second light source 304 and the light source 108 may comprise a single light source (e.g., a very diffuse light source that illuminates the upstream portion 302 and the sawn portion 104 of the piece of wood 106 concurrently). The second light source 304 may also be a structurally separate component or may be housed in the same housing as the light source 108 and the image generator 110. In one embodiment, the second light source 304 is generally aligned with the central axis W of the piece of wood 106 and is configured to illuminate approximately 120° of a surface of the upstream portion 302, including surfaces of the upstream portion 302 that will soon be illuminated by the light source 108. Of course, in other embodiments, other configurations for the second light source 304 are also possible.

In one embodiment, the image generator 110 and the second light source 304 may be configured to detect brightness levels from the upstream portion 302 of the piece of wood 106. For example, in one embodiment, the image generator 110 may measure an amount of reflected light from each pixel along the line of laser light produced by the second light source 304. The detected brightness level may be represented by a gray scale value corresponding to a color of the scanned piece of wood 106. The upstream portion 302 of the piece of wood 106 may include a previously sawn or chipped face 120, such that knots 306 in the wood are visible. In such an embodiment, if the face 120 of the piece of wood 106 includes knots 306, or other sources of discoloration, the image generator 110 may generate image data representative of this discoloration and pass this data on to the computing device 116 for analysis.

Figure 4:
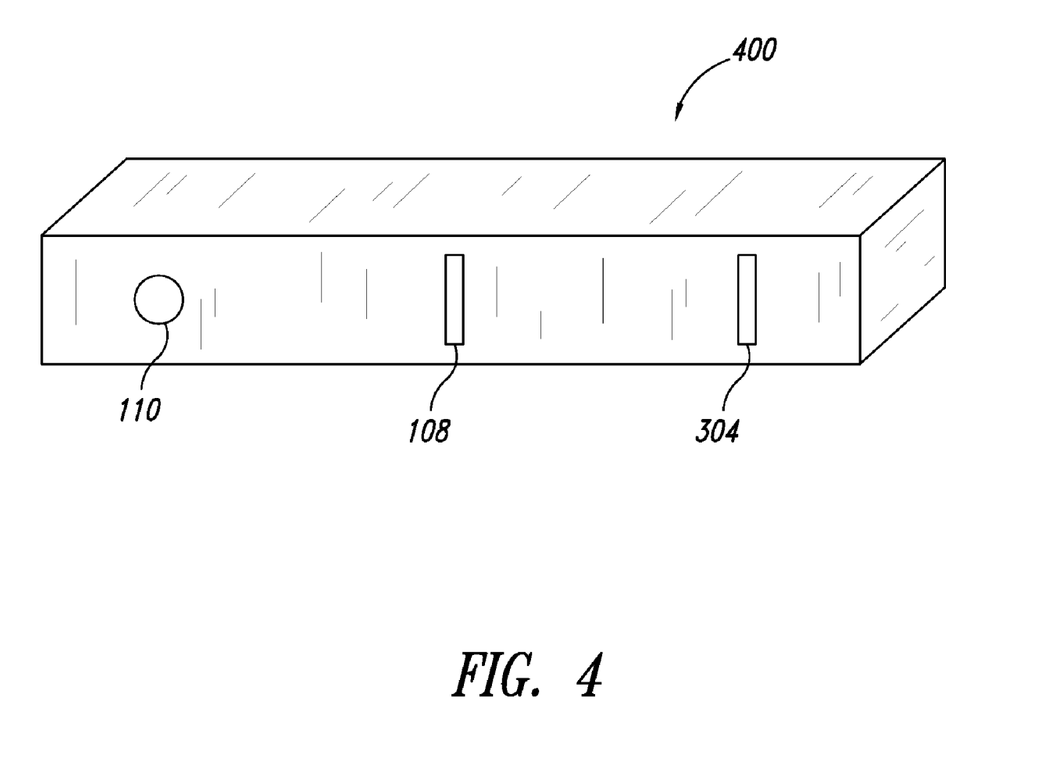
FIG. 4 is a schematic view of a laser scanner including two light sources and a single image generator that may be used in the system of FIG. 3A.

FIG. 4 is a schematic view of an example laser scanner 400 including two light sources 108, 304 and a single image generator 110 that may be used in the system 300 of FIG. 3A.

According to one embodiment, the laser scanner 400 comprises two sources of laser light and a CCD camera. A wired or wireless output interface (not shown) may also be provided for transmitting image data from the image generator 110 to the computing device 116. Similarly configured laser scanners may be obtained commercially, such as the JS-20DL product by JoeScan of Vancouver, Wash. In another embodiment, the laser scanner may include only one light source 108, as is implemented in the system 100 of FIGS. 1A-1C.

Figure 5:
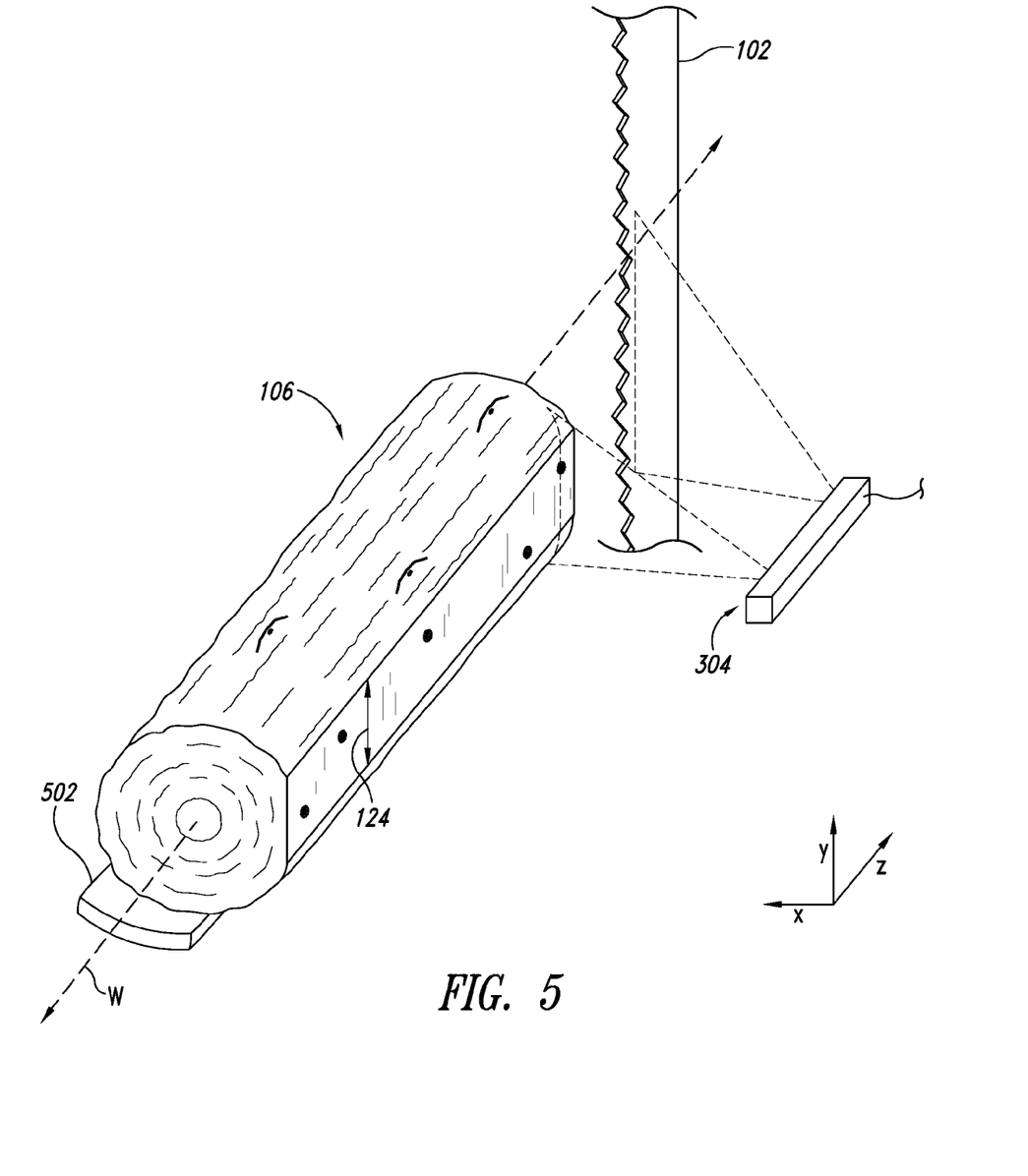
FIG. 5 is a perspective view of the system of FIG. 3A, wherein the piece of wood is not yet engaged by the saw blade.

FIG. 5 is a perspective view of the system 300 of FIG. 3A, wherein the piece of wood 106 is not yet engaged by the illustrated saw blade 102.

As illustrated, the second light source 304 may be used to illuminate an upstream portion 302 of the piece of wood 106 before the piece of wood 106 is engaged by the band saw 118, and the image generator 110 may generate data representative of the upstream portion 302. The computing device 116 may then determine at least one geometric characteristic of the upstream portion 302, including, for example, contour and position information. Based on the data received from the image generator 110, the computing device 116 may control movement of the log carriage 502 to ensure that the piece of wood 106 is correctly positioned relative to the band saw 118. Such changes may include adjustments in the x-direction, or speeding up or slowing down the approach of the piece of wood 106 in the z-direction towards the saw blade 102.

Discussion of Exemplary Methods of Monitoring Saw Blades

Figure 6:
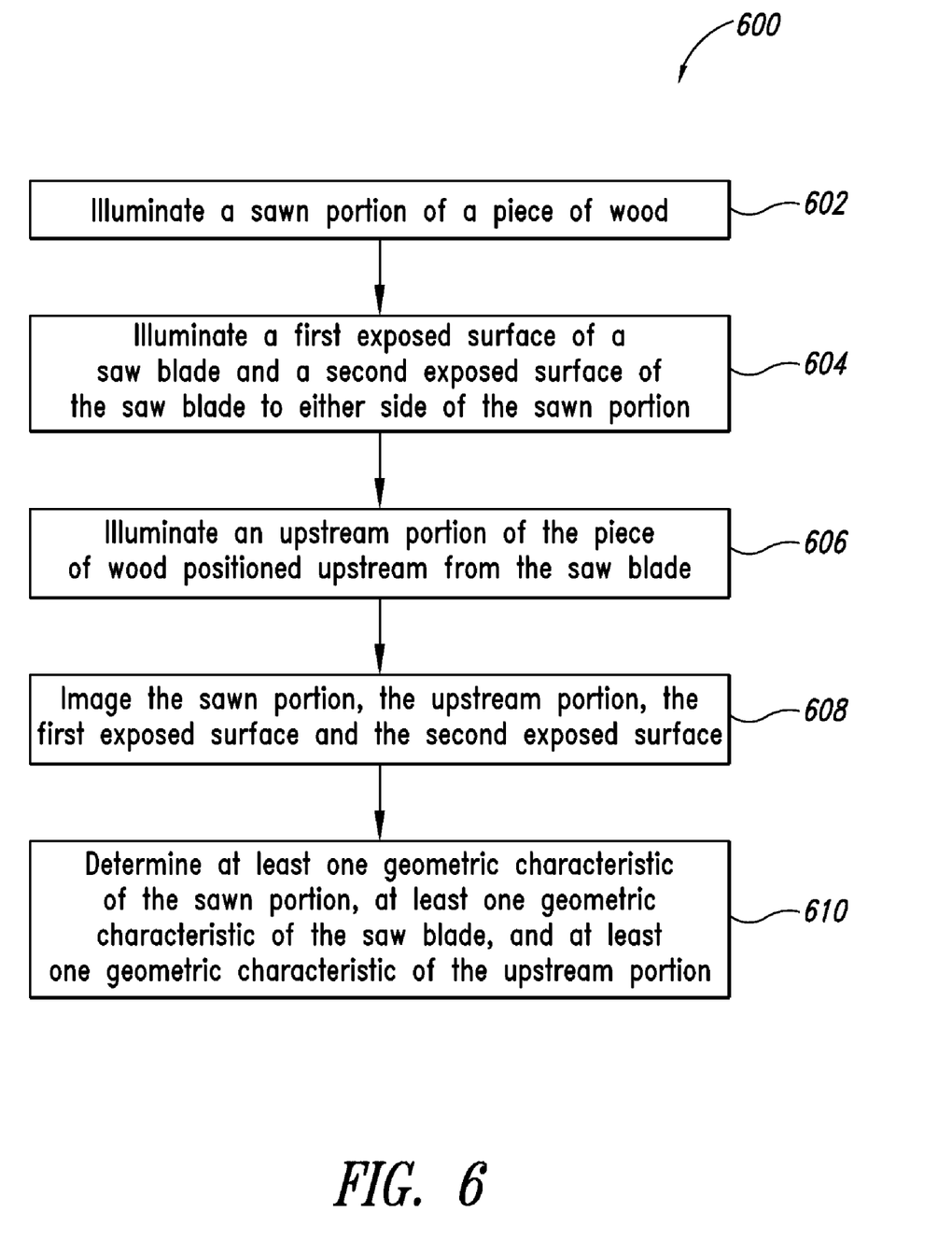
FIG. 6 is a flow diagram illustrating a method of monitoring a saw blade and a sawn portion of a piece of wood, according to one illustrated embodiment.

FIG. 6 illustrates a flow diagram for a method 600 of monitoring saw blades according to one embodiment. The flow diagram will be discussed in terms of the system 300 of FIG. 3A. However, the acts of the method 600 may be carried out using other systems and devices as well.

The method 600 begins at 602, when a sawn portion 104 of a piece of wood 106 is illuminated. As illustrated in FIG. 3A, this sawn portion 104 may be located adjacent the saw blade 102 and positioned between a light source 108 and the saw blade 102, thereby obscuring a portion of the saw blade 102. The sawn portion 104 of the piece of wood 106 may have just been sawn when it is illuminated by the light source 108. Indeed, in the illustrated embodiment, upstream of the sawn portion 104, the piece of wood 106 remains unitary.

At 604, a first exposed surface 112 of the saw blade 102 and a second exposed surface 114 of the saw blade 102 are illuminated. In one embodiment, the same light source 108 illuminates these two exposed surfaces, extending from behind the edges of the sawn portion 104, as illustrated in FIG. 3A.

At 606, an upstream portion 302 of the piece of wood 106 is illuminated. A second light source may be used to illuminate the upstream portion 302. In one embodiment, it may be understood that, as the piece of wood 106 is sawn, the upstream sections of the piece of wood 106 move continuously downstream to be sawn at the saw blade 102. Thus, the illuminated upstream portion 302 and the illuminated sawn portion 104 are constantly changing.

At 608, the sawn portion 104, the upstream portion 302 and the exposed surfaces 112, 114 of the saw blade 102 are imaged. The image generator 110 may be a CCD camera or other imaging device as described above and may generate image data representative of the illuminated surfaces of the piece of wood 106 and the saw blade 102. In one embodiment, the image data is then forwarded on to the computing device 116 for further processing.

At 610, at least one geometric characteristic of the sawn portion 104, at least one geometric characteristic of the saw blade 102 and at least one geometric characteristic of the upstream portion 302 are determined. In one embodiment, these geometric characteristics are determined by the computing device 116 based at least in part on the image data received from the image generator 110.

In certain embodiments, the upstream portion 302 of the piece of wood 106 need not be illuminated or imaged. In such embodiments, act 606 of the illustrated method may be omitted, and acts 608 and 610 may be modified to omit references to the upstream portion 302.

The computing device 116 may perform a number of other acts based at least in part on the data received from the image generator 110. In one embodiment, the computing device 116 may be coupled to a sawing control system 258 (as illustrated in FIG. 2) and may control movement of a log carriage based on data received from the image generator 110. For example, if, as illustrated in FIG. 5, the piece of wood 106 is not yet engaged by the saw blade 102, at least one geometric characteristic determined for the upstream portion 302 may include its location and surface contour. Based on these determined geometric characteristics and the location of the saw blade 102, the computing device 116 may further determine a predicted thickness of the sawn portion prior to sawing. If the predicted thickness determined by the computing device 116 is not appropriate for the next sawing step, the piece of wood 106 may be rotated or moved (e.g., in the x-direction) in order to correct this error prior to sawing. In another embodiment, the at least one geometric characteristic determined for the upstream portion 302 may be used to update a calculation of the optimal mix of lumber for the piece of wood 106, and the sawing process may be updated accordingly.

In another embodiment, the computing device 116 may otherwise control movement of the log carriage based on the determined geometric characteristics. For example, the computing device 116 may determine when the sawn portion 104 has dropped away from the saw blade 102 based on image data from the image generator 110. The computing device 116 may then cause a log carriage carrying the piece of wood 106 to move in the negative z-direction for another pass through the band saw 118. In yet another embodiment, the computing device 116 may determine when the piece of wood 106 has moved sufficiently in the negative z-direction for the next pass based on image data from the image generator 110 (for example, as soon as the piece of wood 106 has completely passed the second light source 304). The computing device 116 may also move the log carriage faster or slower during sawing based at least in part on the geometric characteristics determined for the saw blade 102 (e.g., based on geometric characteristics indicative of saw deflection).

In another embodiment, brightness levels of the upstream portion 302 of the piece of wood 106 may be detected by the image generator 110 and analyzed by the computing device 116. In one embodiment, the computing device 116 determines a quality of the piece of wood 106 based at least in part on the detected brightness levels. For example, the piece of wood 106 may be scanned as it is moving in the negative z-direction in preparation for a next pass through the band saw 118. The brightness levels may be analyzed to discriminate relatively clear pieces of wood (i.e., wood without knots or other imperfections) from those pieces of wood having multiple knots (e.g., knots 306) or other discolorations, thereby distinguishing the quality of the piece of wood. These brightness levels may be used to determine a predicted quality of the next board that may be sawn from the piece of wood 106. Based on this quality data, the computing device 116 may update the sawing process. For example, if the piece of wood 106 is relatively clear (as may have been assumed by a computer optimizer), a certain mix of lumber may be most valuable. However, upon determining that the piece of wood 106 is very knotty, a computer optimizer may need to recalculate the optimal mix of lumber.

In another embodiment, the upstream portion 302 of the piece of wood 106 illuminated by the second light source 304 may be analyzed by the computing device 116 to detect knot indicators (illustrated as callout 308 in FIG. 3B). Knot indicators may appear as small surface imperfections that indicate the presence of a knot. Based at least in part on these knot indicators, the computing device 116 may determine a quality of the piece of wood 106. This determined quality may be used, as discussed above, to change and/or update the sawing process.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any computer and/or processor related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

I claim:

1. A system for monitoring a saw blade comprising:
a light source positioned to illuminate a sawn portion of a piece of wood, the sawn portion adjacent a saw blade and positioned between the light source and the saw blade, a first exposed surface of the saw blade to a first side of the sawn portion, and a second exposed surface of the saw blade to a second side of the sawn portion;
an image generator positioned to generate an image of the sawn portion, the first exposed surface and the second exposed surface substantially concurrently, wherein the light source and image generator are positioned substantially perpendicular to a plane through which the saw blade passes through the portion of the piece of wood being sawn; and a computing device
coupled to the image generator to receive data from the image generator and configured to determine at least one geometric characteristic of the sawn portion and at least one geometric characteristic of the saw blade based on the received data.

2. The system of claim 1, further comprising:
a second light source positioned to illuminate an upstream portion of the piece of wood positioned upstream from the saw blade;
wherein the image generator is further positioned to generate an image of the upstream portion; and
wherein the computing device is further configured to determine at least one geometric characteristic of the upstream portion.

3. The system of claim 2, wherein the piece of wood is mounted on a log carriage.

4. The system of claim 3, wherein the computing device is configured to control movement of the log carriage based at least in part on the received data.

5. The system of claim 2, wherein the image generator is further configured to detect brightness levels of the upstream portion.

6. The system of claim 5, wherein the upstream portion includes a previously sawn face of the piece of wood, and wherein the computing device is further configured to determine a quality of the piece of wood based at least in part on the detected brightness levels.

7. The system of claim 2, wherein the computing device is further configured to detect a knot indicator.

8. The system of claim 7, wherein the computing device is further configured to determine a quality of the piece of wood based at least in part on the detected knot indicator.

9. The system of claim 2, wherein the computing device is further configured to determine a predicted thickness of the sawn portion prior to sawing based at least in part on the at least one geometric characteristic of the upstream portion and control movement of the piece of wood based at least in part on the predicted thickness.

10. The system of claim 1, wherein the computing device is further configured to determine a width of the sawn portion of the piece of wood adjacent the saw blade.

11. The system of claim 1, wherein the light source includes a planar laser scanner.

12. The system of claim 1, wherein the image generator is a charged coupled device (CCD) camera.

13. A system to monitor a saw blade, the system comprising:
a light source that produces at least one line of light that illuminates a portion of a piece of wood being sawn and both a first and a second exposed surface of a saw blade that extends respectively from a first and a second edge of the portion of the piece of wood being sawn during sawing;
an imager having a field of view that concurrently encompasses the illuminated sawn portion, the first exposed surface and the second exposed surface of the saw blade, wherein the light source and imager are positioned substantially perpendicular to a plane through which the saw blade passes through the portion of the piece of wood being sawn; and
a computer communicatively coupled to the imager to receive data from the imager and configured to determine at least one geometric characteristic of the portion of the piece of wood being sawn and at least one geometric characteristic of the saw blade based on the received data.

14. The system of claim 13, further comprising:
a second light source positioned to illuminate an upstream portion of the piece of wood that is upstream from the saw blade with respect to a direction of travel of the piece of wood relative to the saw blade;
wherein the field of view of the imager further encompasses the upstream portion; and
wherein the computer is further configured to determine at least one geometric characteristic of the upstream portion.

15. The system of claim 14, wherein the piece of wood is mounted on a log carriage and the computer controls movement of the log carriage based at least in part on the received data.

16. The system of claim 14, wherein the imager detects brightness levels of the upstream portion and the computer determines a quality of the piece of wood based at least in part on the detected brightness levels.

17. The system of claim 14, wherein the computer detects any knot indicators, and determines a quality of the piece of wood based at least in part on any detected knot indicators.

18. The system of claim 14, wherein the computer determines a predicted thickness of the portion of the wood prior to sawing based at least in part on the at least one geometric characteristic of the upstream portion and controls movement of the piece of wood based at least in part on the predicted thickness.

19. The system of claim 14, wherein the computer determines a width of the sawn portion of the piece of wood adjacent the saw blade.

20. The system of claim 14, wherein the light source includes a laser source that produces a laser beam that scans back and forth to produce the line of light.

21. The system of claim 14, wherein the light source includes two laser sources that produce respective laser beams that scan back and forth, the two light sources collocated with the imager to be mounted at a single location.

* * * * *